United States Patent [19]
McRobert

[11] 3,914,925
[45] Oct. 28, 1975

[54] WINDROWING MACHINE WITH ROTARY BRUSH AND DEPTH CONTROL UNIT

[75] Inventor: Leon R. McRobert, Ocoee, Fla.
[73] Assignee: FMC Corporation, San Jose, Calif.
[22] Filed: Apr. 23, 1974
[21] Appl. No.: 463,328

[52] U.S. Cl. .............................................. 56/328 R
[51] Int. Cl.² ........................................... A01D 51/00
[58] Field of Search ............ 56/328 R, 94, 192, 15.7, 56/17.1, 11.2, 13.4, 17.4, 295; 172/111

[56] References Cited
UNITED STATES PATENTS

| | | | |
|---|---|---|---|
| 1,600,836 | 9/1926 | Manson | 56/94 |
| 2,669,826 | 2/1954 | Watrous | 56/13.4 |
| 3,066,745 | 12/1962 | Smith et al. | 172/111 X |
| 3,190,364 | 6/1965 | Maloney | 172/111 |
| 3,200,890 | 8/1965 | Courtway | 172/111 |
| 3,415,043 | 12/1968 | Shones | 56/13.6 |
| 3,762,140 | 10/1973 | Block | 56/328 R |

*Primary Examiner*—Russell R. Kinsey
*Attorney, Agent, or Firm*—C. E. Tripp; A. J. Moore

[57] ABSTRACT

A windrowing machine includes a main rake and a reciprocable slide rake projecting outwardly and forwardly from the chassis of a mobile vehicle toward a row of trees being harvested. The rakes are partially supported in operative windrowing position by a generally horizontal boom which is hydraulically raised or lowered as required. The slide rake is pivotally connected to the boom and has its inner rear end supported by a caster wheel and its diagonally opposite outer forward end supported by a rotary depth control disc of a windrowing brush and depth control unit. The brush and depth control unit is driven by power means that includes a shaft which drives the brush and also drives the flat depth control disc. The disc is connected to the drive shaft of the power means by a universal joint. The plane of the brush is angled downwardly and forwardly approximately 10° relative to the horizontal for engaging and sweeping the fruit inwardly from its path, while the rotating disc assumes the average inclination of uneven soil upon which it rests by flattening the soil due to its rotation and universal mounting.

12 Claims, 4 Drawing Figures

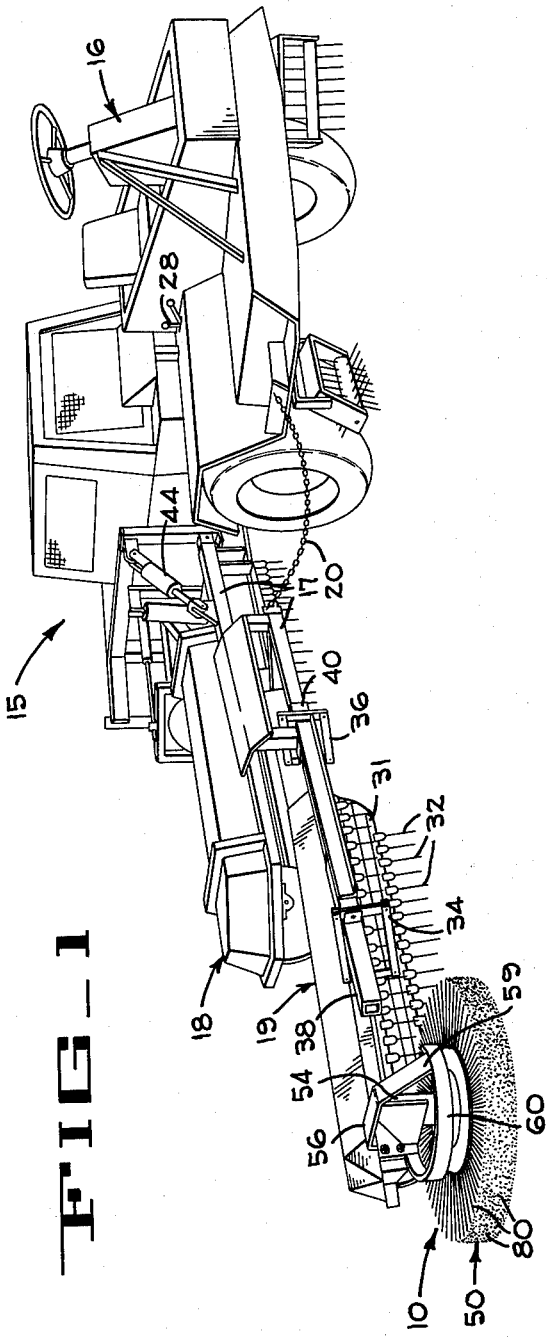
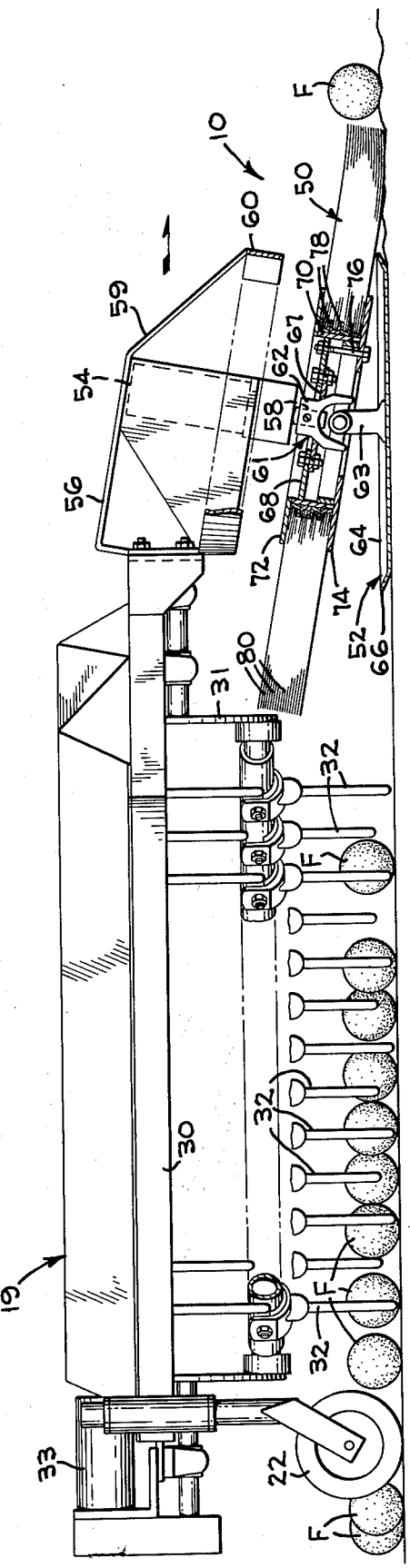

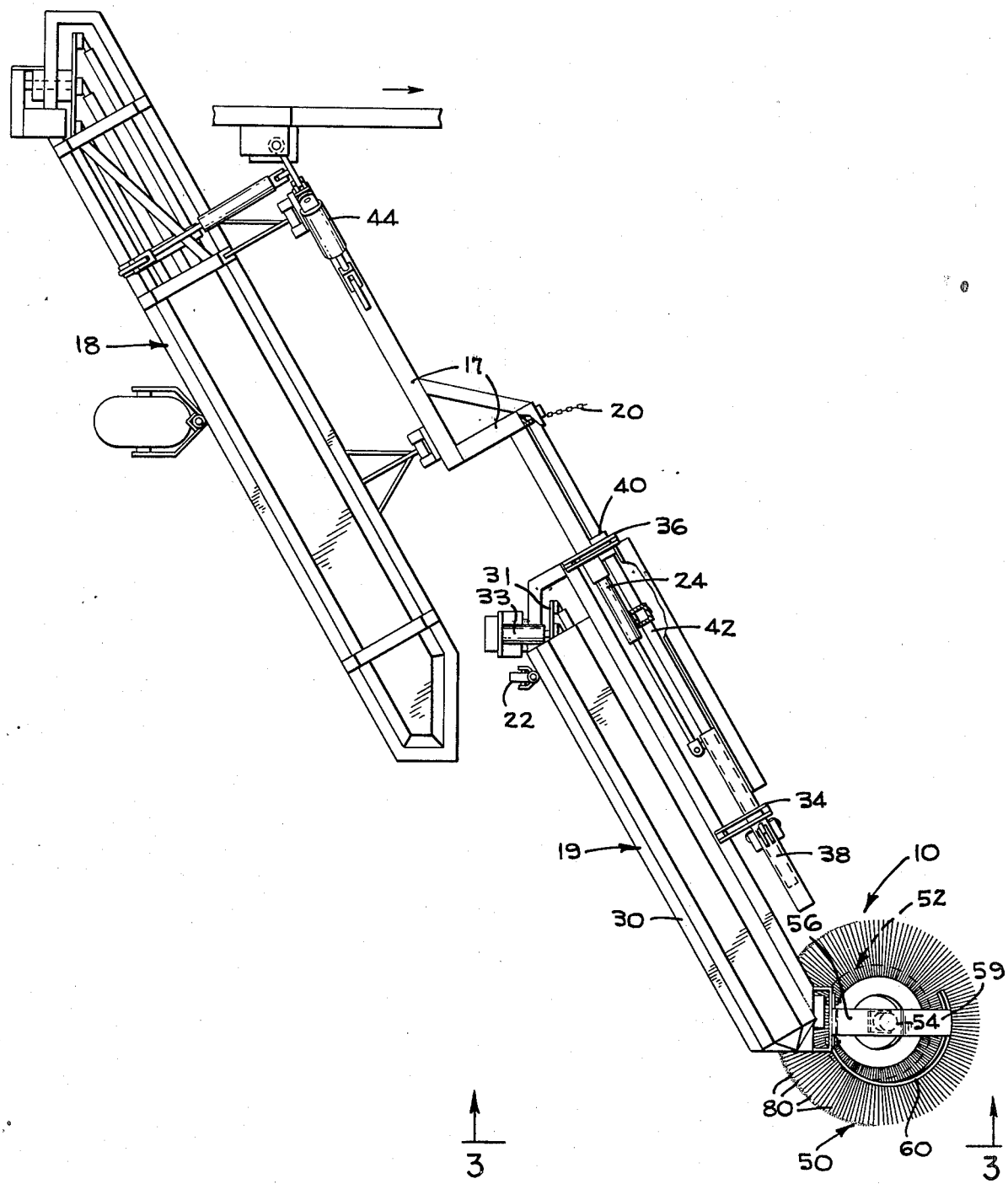

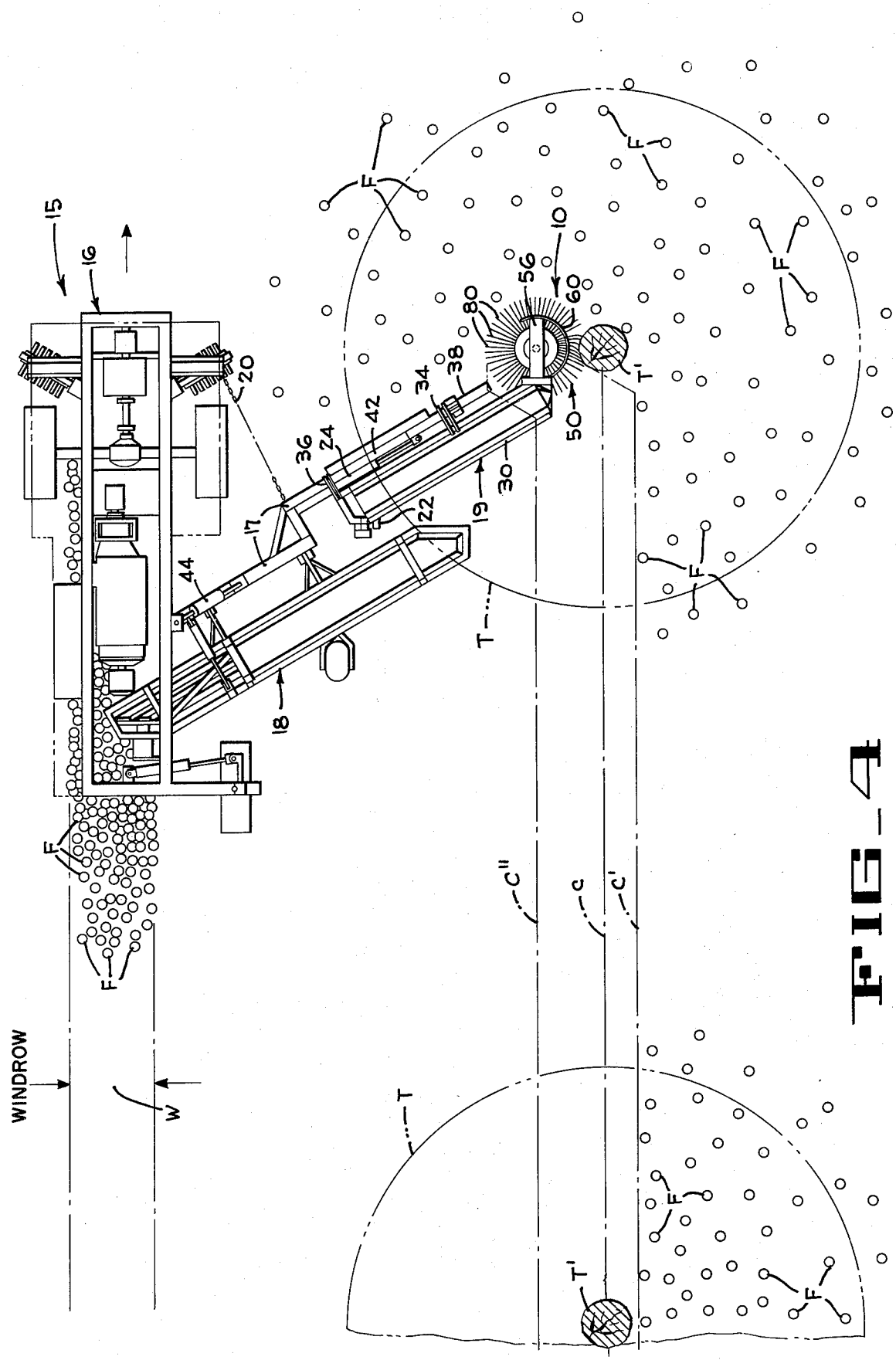

WINDROWING MACHINE WITH ROTARY BRUSH AND DEPTH CONTROL UNIT

BACKGROUND OF THE INVENTION

1. Field of the Invention

This invention pertains to the windrowing art, and more particularly relates to a windrowing machine for fruit or the like having a rotary brush and depth control unit attached to the outer forward end thereof.

2. Description of the Prior Art

It is well known in the art to shake fruit, such as citrus fruit, from trees and to then move the fruit into windrows for easy access to pickup machines. Such a windrowing machine is disclosed in U.S. Pat. No. 3,762,140 which issued to Donald P. Block on Oct. 2, 1973 and is assigned to the assignee of the present invention.

Two substantial problems exist when windrowing orchard crops. The first problem is to reliably maintain the fruit engaging members of the windrower in windrowing position relative to the ground when the ground is not level but includes high and low areas; or when the ground is generally level but contains a substantial number of clods, rocks, clumps of grass or the like. Another problem is to gently move the fruit from a path which includes the centerline of the trees being harvested, inwardly from that path without damage to the fruit or to the trees.

Windrowers which mount a series of driven brushes rigidly secured to and supported by convex discs, with the brushes spaced along an axis angled relative to the direction of movement of a towing vehicle are also known. However, the gradual accumulation of articles being windrowed, which articles progressively move from brush to brush, tends to overload the innermost brush rendering the machine undesirable for many harvesting uses.

Patents such as Reynolds U.S. Pat. No. 348,778 disclose a street sweeping apparatus including a series of brushes supported on a vehicle at an angle relative to the direction of movement of the vehicle, while the patent to Teagle U.S. Pat. No. 3,527,040 discloses a foot pad of convex arcuate configuration for preventing the tines of a hay-tedder from digging into the ground. The patent to Keogh U.S. Pat. No. 2,655,678 discloses a small roller or pilot wheel which leads a roadway sweeping broom for controlling the elevation of the broom.

SUMMARY OF THE INVENTION

The rotating brush and depth control unit of the present invention comprises a hydraulic motor which drives a shaft having the brush rigidly secured thereto for rotation in a plane inclined forwardly and downwardly about 10°. The depth control or vehicle supporting mechanism comprises a generally horizontal flat circular disc with an upwardly turned flanged periphery. The disc is secured to the motor's drive shaft through a universal joint thus not only permitting the rotating disc to seek the average elevation of uneven or rough, cloddy ground, but also to serve as a means for leveling the ground upon which it rotates.

The rotary brush and depth control mechanism is used in conjunction with a windrower for maintaining the brush and one end of a slide rake at a desired average windrowing height relative to the ground. The mechanism is mounted on the outer forward end of the slide rake while a caster wheel is mounted on the diagonally opposite rear inner end of the slide rake thereby together determining the operating height of both the brush and slide rake. Since the rotating depth control disc is positioned forwardly, rather than rearwardly, of the slide rake and tends to level the ground upon which it rides in front of the slide rake, it has been determined that the height of the slide rake is much more accurately controlled than heretofore believed to be possible.

The rotating brush and depth control unit is moved into the tree row centerline to sweep fruit from the centerline, and upon approaching a tree trunk is moved out of the tree row centerline by manually actuated hydraulic control means. The brush is arranged to sweep the fruit from a path which overlaps the path of movement of the outer end of the slide rake thus preventing the outermost tines of the slide rake from moving downwardly onto the fruit and defacing or otherwise damaging the same.

It is therefore one object of the present invention to provide a rotary brush and depth control unit with the depth control mechanism being in the form of a flat disc connected to the brush drive shaft by a universal joint.

Another object is to provide a windrowing machine having a rake supported at its outer forward end by a driven, generally horizontal flat disc, and supported at its diagonally opposite inner rear end by a rotating leveling device.

Another object is to provide a windrowing machine including a slide rake having a driven brush and depth control means on its free end movable into and out of the tree row centerline for removing fruit therefrom.

Another object is to provide a windrowing machine including a slide rake having a driven brush and depth control mechanism on its free end for clearing a path in front of the outer end of the slide rake to minimize injury to the windrowed fruit.

BRIEF DESCRIPTION OF THE DRAWINGS

FIG. 1 is a perspective of a windrowing machine in operative position and having the rotary brush and depth control unit of the present invention incorporated therewith.

FIG. 2 is a plan of the main rake, slide rake, and brush and depth control unit illustrating the relative position of the windrowing components.

FIG. 3 is an enlarged end view taken looking in the direction of the arrows 3—3 of FIG. 2 illustrating the structure for supporting the slide rake and brush at the desired windrowing elevation, the brush and depth control unit being illustrated in central section.

FIG. 4 is an operational view in plan illustrating the windrowing operation and the path of movement of the brush and depth control unit relative to the tree row centerline.

DESCRIPTION OF THE PREFERRED EMBODIMENT

The rotary brush and depth control unit 10 (FIGS. 1 and 4) of the present invention is associated with a windrowing machine 15 for windrowing citrus fruit F previously shaken upon the ground from rows of trees T having trunks T' planted along the row centerline C. The machine 15 is designed to rake fruit from between the trees T along the tree row centerline as well as from the area under the half row being raked, and to deposit all of this raked fruit into a single non-wavy windrow W. Although the windrowing machine 15 will be described in the specification as handling citrus fruit, it will be understood that the machine may also handle other types of articles such as deciduous fruit and nuts, and even non-agricultural articles.

In general, the windrowing machine 15 (FIGS. 1 and 4) comprises a three-wheeled vehicle 16 having a generally horizontal boom assembly 17 pivotally connected thereto and projecting outwardly from one side thereof. A main non-reciprocating rake 18 and reciprocable sliding rake 19 are partially supported by the boom assembly 17 and are maintained in operative raking position angled outwardly and forwardly relative to the longitudinal axis of the vehicle by a connector such as a chain 20. The length of the chain may be varied to adjust the angle of the rake relative to the longitudinal axis of the vehicle 16 so that a portion of the brush and depth control unit 10 will normally extend beyond the centerline C of the tree row being raked, as indicated by line C' in FIG. 4, when the vehicle is being driven midway between two trees. The path of movement of the brush is indicated by lines C' and C''.

The brush and depth control unit 10 of the present invention is mounted on the outer end of the slide rake 19 and cooperates with the diagonal opposite leveling device or caster wheel 22 to maintain both the brush and slide rake at a desired windrowing elevation relative to the surface of the ground which is not flat but varies in elevation and may include level disrupting clods and rocks or the like. The slide rake, and brush and depth control unit 10 are reciprocated by a manually controlled hydraulic cylinder 24 (FIG. 2) outwardly f the tree row centerline in response to manual control of a valve 28 (FIG. 1) by the operator when the brush approaches a tree trunk T (FIG. 4). It will be understood however, that the bristles of the brush are allowed to contact and move around the tree trunk to sweep fruit away from the trunk T''. The slide rake 19 and unit 10 are thereafter returned to their extended position when the unit 10 has moved past the tree trunk by reverse manual operation of the control valve 28.

Since the major portion of the windrowing machine is the same or substantially the same as that disclosed in the aforementioned Block U.S. Pat. No. 3,762,140, the description of the Block patent is incorporated herein by reference.

The slide rake 19 (FIG. 2) includes an elongated frame 30 (FIGS. 2 and 3) having a reel 31 with a plurality of rows of picking fingers 32 projecting downwardly. The reel is journaled on the frame 30 and is driven by a hydraulic motor 33. The forward portion of the frame is connected by parallelogram linkages 34 and 36 to tubular slides 38 and 40 of rectangular cross section that are slidably received on a rectangular member 42 (FIG. 2) of the boom assembly 17. During the windrowing operation the boom assembly is held by a hydraulic lift cylinder 44 in a generally horizontal position to allow the parallelogram linkages 34 and 36 to permit limited upward or downward movement of the slide rake 19 in order to compensate for variations in the contour of the ground.

It is, of course, apparent that the picking fingers 32 must maintain a relatively constant height above the ground, which may vary in contour, in order to avoid moving over fruit F in a depression and digging into the soil when an elevated portion is reached. For this reason, a leveling device such as the caster wheel 22 is connected to the rear inner portion of the frame 30 and cooperates with the brush and depth control unit 10, which is mounted on the diagonally opposite portion of the frame 30, to maintain the fingers 32 in their desired windrowing position relative to the ground. Since the brush and depth control unit 10 is in front of the slide rake 19, the unit encounters variations in contour before the slide rake reaches them, and tends to flatten the variations as will be made apparent hereinafter.

The rotary brush and depth control unit 10 (FIGS. 2 and 3) comprises a brush 50 and a leveling mechanism 52 both driven by a hydraulic motor 54. The motor 54 is secured to a sub-frame 56 that is bolted to the forward outer corner of the slide rake frame 30 so that the upstanding drive shaft 58 of the motor is angled rearwardly and downwardly about 10° relative to the vertical as indicated in FIG. 3. The sub-frame 56 includes an angled upper shield 59 and an arcuate strap 60 for deflecting tree limbs or the like away from the unit 10. A universal joint 61 has its upper portion 62 rigidly secured to the drive shaft 58 and has its lower portion 63 rigidly secured to the leveling mechanism 52 which includes a flat, circular, vehicle supporting or depth control disc 64 having an annular upturned peripheral flange 66 which aids in guiding the flat rotating disc over the ground. The brush 50 includes a mounting annulus 67 welded to the upper portion 62 of the universal joint to which is bolted an outer annulus 68 having a brush centering ring 70 welded thereto and concentric with the shaft 58. An upper brush retaining flange 72 is welded to the upper end of the ring 70 and cooperates with a lower annulus 74 connected to the annulus 68 by bolts 76 for clamping a plurality of bristle supporting channels 78 therebetween. The bristles 80 of the brush 50 project outwardly beyond the disc 64 as indicated in FIG. 3 to engage and sweep the fruit inwardly.

In operation, the windrower 15 is driven between the rows of trees from which fruit F has been previously shook as indicated in FIG. 4. The operator manually controls the slide rake reciprocating cylinder 24 causing the slide rake and attached brush and depth control unit to first sweep the fruit from the centerline C of the tree rows and to then retract away from each tree trunk T' about 6 to 10 inches as diagrammatically indicated by lines C' and C'' in FIG. 4. During this operation the brush bristles actually contact the trunk T' of the tree and will deflect about 6 inches thus assuring that fruit immediately adjacent the trunk will be windrowed. It will be noted that the path swept by the brush 50, as indicated by the space between lines C' and C'' in FIG. 4, overlaps the outer end of the slide rake 18. By positioning the brush 50 so that it will sweep the fruit F free from the outer end of the slide rake 19, it will be apparent that fruit will not be in position to be impaled or otherwise damaged as the rake fingers 32 move downwardly into windrowing position at the far outer end of the slide rake, which outer end is not shielded by other forward fingers already in the raking position as is the case with the inner portions of the slide rake 19.

Another important feature of the invention is that the rotating flat disc 64 of the depth control mechanism 52 contacts a relatively wide area of the ground, and because of its rotation and connection to the drive shaft by a universal joint 61, tends to flatten the soil upon which it rides. In this regard, it should be pointed out that a slight ridge and an adjacent gulley are quite frequently present immediately adjacent the tree row centerline because prior to harvesting the soil is prepared by discing, and/or rolling or slabing. These ground preparation implements are pulled through the orchard parallel to the tree rows and, accordingly, tend to leave uneven portions at their outer ends adjacent the tree row centerline. Since the flat disc rides on and flattens the ground forwardly of the outer slide rake in an area where the ground is apt to be quite uneven, it is apparent that the ability of the rotating disc to flatten and also level the soil is very important. It is also apparent that the disc very accurately maintains the windrowing depth for not only the brush but also for the outer end portion of the slide rake while the inner end portion of the rake is maintained at the desired level by the caster wheel 22.

It will be recognized that if the rotating disc is moving along an inclined surface, for example up a hill, the disc will tend to flatten the inclined surface upon which it rides but does not tend to level that surface. Thus, the plane of the disc will tend to be substantially parallel to the average plane of the surface upon which it rides.

From the foregoing description it will be apparent that the rotary brush and depth control unit is mounted on the forward outer end of the slide rake and not only accurately controls the depth of the brush but also cooperates with the leveling device 22 to more accurately control the depth of the slide rake than has heretofore been believed possible. This accurate leveling is made possible by rotating the flat disc which is mounted for universal movement thereby tending to level the soil upon which it rides thus accounting for the improved depth controlling accuracy. Since the brush and depth control unit is mounted in front of the leading outer end of the slide rake, the brush sweeps all fruit clear of the outer end of the slide rake thus minimizing damage to the fruit and also effectively windrowing the fruit that lies in the tree row centerline.

Although the rotating disc is described in its preferred embodiment as a depth control device for controlling the height of a windrowing brush or rake relative to the ground, it will be understood that the disc may be used in other environments. For example, the driven upright shaft with its universally mounted flat disc may be used to support any type of vehicle on soft surfaces such as soft or wet land, marsh lands, ice, or snow. It is also apparent that the device will work on flat surfaces as well as surfaces that vary in elevation and that a wheel and tire may be substituted for the brush to act as a ground engaging drive means.

Although the best mode contemplated for carrying out the present invention has been herein shown and described, it will be apparent that modification and variation may be made without departing from what is regarded to be the subject matter of the invention.

I claim:

1. A rotary brush and depth control unit comprising; support means movable along a path over a supporting surface having articles thereon, a driven shaft journaled on said support means and angled rearwardly and downwardly about 10° from the vertical, a brush secured to said shaft for rotation therewith and having its forward portion disposed in position to engage and sweep the articles in one direction, a flat depth control disc, and means connecting the depth control disc to said shaft for rotation therewith and for universal movement relative thereto with its flat surface riding on the supporting surface for maintaining the brush at a desired level relative to said supporting surface.

2. An apparatus according to claim 1 wherein said connecting means is a universal joint.

3. An apparatus according to claim 1 wherein said supporting surface is soil and wherein said flat depth control disc includes an upstanding annular flange around its periphery to aid in flattening the soil.

4. An apparatus according to claim 1 wherein said support means is a mobile windrowing machine and wherein the articles are citrus fruit.

5. An apparatus according to claim 1 wherein said support means is a mobile windrowing machine for windrowing citrus fruit from a row of trees oriented along a tree row centerline, wherein said brush and depth control unit moves along a path containing said tree centerline, and wherein means are provided on said windrower for withdrawing said brush and depth control means at least partially away from said tree row centerline when the trunk of a tree is contacted by the brush.

6. An apparatus according to claim 1 wherein said shaft is the shaft of a hydraulic motor.

7. In a windrowing machine for windrowing articles lying on the ground, which machine includes a mobile vehicle movable along a path, attachment means connected to and projecting forwardly and outwardly from one side of said vehicle, windrowing means pivotally connected to said connecting means for limiting vertical movement relative thereto and being effective to move articles inwardly toward the vehicle, and contour following means connected to the rear inner portion of said windrowing means for controlling the height thereof relative to the ground; the improvement which comprises a depth control mechanism connected to the forward outer corner of said windrowing means for accurately controlling the vertical distance of the outer portion of said windrowing means above the ground which may vary in elevation, said depth control mechanism including an upright driven shaft, a generally flat ground engaging depth control disc, means connecting said depth control disc to said shaft for rotation therewith and for universal movement relative thereto for flattening the ground upon which it rides thereby more accurately controlling the height of the outer end of said windrowing means, said shaft being angled downwardly and rearwardly about 10° from the vertical, and additionally comprising rotary windrowing means secured to said shaft above said disc for rotation therewith in a plane normal to said shaft, said rotary windrowing means being effective to move articles inwardly from a path in front of the outer forward end of said first mentioned windrowing means for minimizing damage to said articles.

8. An apparatus according to claim 7 wherein said rotary windrowing means is a brush.

9. An apparatus according to claim 7 wherein said shaft is the shaft of a driven hydraulic motor.

10. In a windrowing machine for windrowing fruit lying on the ground under a row of trees in an orchard, which machine includes a mobile vehicle movable along a path parallel to the tree row centerline, a generally horizontal boom connected to and projecting forwardly and outwardly from one side of said vehicle, first windrowing means pivotally connected to said main boom for limited vertical movement relative thereto, contour following means connected to said first windrowing means for controlling the height thereof relative to the ground, second windrowing means pivotally connected to said boom for vertical movement relative thereto, said second windrowing means being positioned forwardly of said first windrowing means, rotatable ground engaging leveling means for supporting the inner rear portion of said second windrowing means, said first and second windrowing means being effective to move fruit within their paths of movement inwardly toward the mobile vehicle and to discharge the fruit in a single windrow; the improvement which comprises a depth control mechanism connected to the forward outer corner of said second windrowing means for accurately controlling the vertical distance of the outer portion of said second windrowing means above the ground which may vary in elevation, said depth control mechanism including an upright driven shaft, a flat ground engaging depth control disc, and means connecting said depth control disc to said shaft for rotation therewith and for universal movement relative thereto for flattening the ground upon which it rides, said shaft being angled downwardly and inwardly about 10° from the vertical, and additionally comprising rotary windrowing means secured to said shaft above said disc for rotation therewith in a plane normal to said shaft, said rotary windrowing means being effective to move articles inwardly from a path in front of the outer forward end of said first mentioned windrowing means for minimizing damage to the articles.

11. An apparatus according to claim 10 wherein said rotary windrowing means is a brush.

12. An apparatus according to claim 11 wherein said brush and said depth control disc normally ride along a path which includes the tree row centerline, and additionally includes means for moving said brush and depth control disc out of said tree row centerline upon approaching a tree trunk and to thereafter return the brush and depth control disc into said tree row centerline after passing said trunk.

* * * * *

UNITED STATES PATENT OFFICE
CERTIFICATE OF CORRECTION

PATENT NO. : 3,914,925
DATED : Oct. 28, 1975
INVENTOR(S) : Leon R. McRobert

It is certified that error appears in the above-identified patent and that said Letters Patent are hereby corrected as shown below:

Column 3, row 35, "f" should be --of--.

Column 3, row 40 "T"" should be --T'--.

Signed and Sealed this

Twentieth Day of July 1976

[SEAL]

Attest:

RUTH C. MASON
Attesting Officer

C. MARSHALL DANN
Commissioner of Patents and Trademarks